United States Patent
Sherman et al.

(10) Patent No.: US 9,486,832 B2
(45) Date of Patent: Nov. 8, 2016

(54) METHOD AND APPARATUS FOR FORMING CLAD METAL PRODUCTS

(75) Inventors: Andrew J. Sherman, Kirtland Hills, OH (US); P. Greg Engleman, Painesville, OH (US); Mario Medanic, Mentor, OH (US); Kurt E. Gilbert, Solon, OH (US)

(73) Assignee: MESOCOAT, INC., Euclid, OH (US)

(\*) Notice: Subject to any disclaimer, the term of this patent is extended or adjusted under 35 U.S.C. 154(b) by 162 days.

(21) Appl. No.: 14/004,372
(22) PCT Filed: Mar. 9, 2012
(86) PCT No.: PCT/US2012/028655
§ 371 (c)(1),
(2), (4) Date: Sep. 10, 2013
(87) PCT Pub. No.: WO2012/122557
PCT Pub. Date: Sep. 13, 2012

(65) Prior Publication Data
US 2014/0004270 A1 Jan. 2, 2014

Related U.S. Application Data

(60) Provisional application No. 61/451,114, filed on Mar. 10, 2011.

(51) Int. Cl.
*B05D 3/00* (2006.01)
*C08J 7/18* (2006.01)
(Continued)

(52) U.S. Cl.
CPC ............. *B05D 3/0254* (2013.01); *B23K 28/00* (2013.01); *B23K 31/027* (2013.01); *C23C 24/08* (2013.01); *F16L 58/08* (2013.01); *B23K 2201/06* (2013.01); *B23K 2201/10* (2013.01)

(58) Field of Classification Search
CPC ... C23C 24/08; C23C 24/082; C23C 24/087; C23C 24/10; C23C 24/103; C23C 24/106; C23C 10/30; B23K 26/0054; B23K 26/106; B23K 26/0823; B23K 26/0853; B23K 9/0026; B23K 6/0052
See application file for complete search history.

(56) References Cited

U.S. PATENT DOCUMENTS 3,394,450 A 7/1968 Gill et al.
4,015,100 A 3/1977 Gnanamuthu et al.
(Continued)

FOREIGN PATENT DOCUMENTS

DE 3247134 A1 6/1984
EP 0988898 A2 3/2000
(Continued)

OTHER PUBLICATIONS

"Magnetic Levitation" published on https://en.wikipedia.org/wiki/Magnetic_levitation Internet site on Jan. 19, 2010; Evidence of this publication date was obtained from the Internet Archive Wayback Machine, which can be found online at http://www.archive.org.
(Continued)

*Primary Examiner* — Michael Wieczorek
(74) *Attorney, Agent, or Firm* — Lance M. Pritikin (57) ABSTRACT

The present invention concerns methods and apparatus for forming a clad product, such as a clad pipe or tube. Particular embodiments include a method for metallurgically bonding cladding material onto a metal substrate, the method including a step of providing a metal substrate comprising a pipe or a tube having a cladding composition arranged along an interior surface of the substrate to form a coated substrate, the interior surface arranged within an interior cavity of the substrate. A further step includes inserting a heat source into an interior cavity of the substrate, the heat source comprising an infrared, microwave, or radio frequency heat source, the heat source being mounted on a heat source-retaining housing, the housing comprising a cantilevered structure. An additional step includes applying heat discharged from the heat source to the coated substrate along the coated interior surface until the cladding composition metallurgically bonds to the substrate.

8 Claims, 10 Drawing Sheets

(51) Int. Cl.
*G21H 5/00* (2006.01)
*B05D 3/02* (2006.01)
*C23C 24/08* (2006.01)
*F16L 58/08* (2006.01)
*B23K 28/00* (2006.01)
*B23K 31/02* (2006.01)

(56) References Cited

U.S. PATENT DOCUMENTS

| | | | |
|---|---|---|---|
| 4,071,641 A | 1/1978 | Susai | |
| 4,212,900 A | 7/1980 | Serlin | |
| 4,349,581 A | 9/1982 | Asano et al. | |
| 4,490,411 A | 12/1984 | Feder | |
| 4,515,832 A | 5/1985 | Roeder et al. | |
| 4,700,102 A | 10/1987 | Camm et al. | |
| 4,745,245 A | 5/1988 | Kitaide et al. | |
| 4,772,773 A | 9/1988 | Hashimoto et al. | |
| 4,790,471 A | 12/1988 | Turner | |
| 4,865,116 A | 9/1989 | Peterson et al. | |
| 4,881,679 A | 11/1989 | Turner | |
| 5,123,476 A | 6/1992 | Fealey | |
| 5,561,735 A | 10/1996 | Camm | |
| 5,584,428 A | 12/1996 | Satoh et al. | |
| 5,818,649 A | 10/1998 | Anderson | |
| 5,919,388 A * | 7/1999 | Kawano et al. | 219/644 |
| 5,993,915 A | 11/1999 | Krebsbach | |
| 6,010,746 A * | 1/2000 | Descoteaux | B23K 20/002 427/140 |
| 6,174,388 B1 | 1/2001 | Sikka et al. | |
| 6,280,800 B1 | 8/2001 | Thiele et al. | |
| 6,350,327 B2 | 2/2002 | Neill | |
| 6,361,581 B2 | 3/2002 | Yasuda et al. | |
| 6,432,555 B1 | 8/2002 | Sikka et al. | |
| 6,540,800 B2 | 4/2003 | Sherman et al. | |
| 6,594,446 B2 | 7/2003 | Camm et al. | |
| 6,621,199 B1 | 9/2003 | Parfeniuk et al. | |
| 6,641,918 B1 | 11/2003 | Sherman et al. | |
| 6,649,682 B1 | 11/2003 | Breton et al. | |
| 6,691,397 B2 | 2/2004 | Chakravarti | |
| 6,858,262 B2 * | 2/2005 | Fischer | B23K 26/0823 219/121.64 |
| 6,939,576 B2 | 9/2005 | Deshpande et al. | |
| 7,041,250 B2 | 5/2006 | Sherman et al. | |
| 7,184,657 B1 | 2/2007 | Camm et al. | |
| 7,220,936 B2 | 5/2007 | Ott et al. | |
| 7,345,255 B2 | 3/2008 | Jiang et al. | |
| 7,358,462 B2 | 4/2008 | Timans | |
| 7,560,067 B2 | 7/2009 | Sherman | |
| 7,635,515 B1 | 12/2009 | Sherman | |
| 7,681,622 B2 | 3/2010 | Sherman | |
| 8,187,720 B2 | 5/2012 | Choi et al. | |
| 8,206,792 B2 | 6/2012 | Gollob et al. | |
| 2002/0051848 A1 | 5/2002 | Li | |
| 2004/0194662 A1 | 10/2004 | Itsukaichi et al. | |
| 2005/0116336 A1 | 6/2005 | Chopra et al. | |
| 2007/0132228 A1 | 6/2007 | Montague | |
| 2009/0250439 A1 | 10/2009 | Workman et al. | |
| 2009/0274850 A1 * | 11/2009 | Bhatia | C04B 41/5024 427/540 |
| 2010/0203255 A1 | 8/2010 | Sherman | |
| 2010/0297432 A1 | 11/2010 | Sherman et al. | |
| 2011/0259509 A1 | 10/2011 | Pirie et al. | |

FOREIGN PATENT DOCUMENTS

| | | | |
|---|---|---|---|
| JP | 58210123 A | | 12/1983 |
| JP | 60002676 | | 1/1985 |
| JP | 360064785 A | | 4/1985 |
| JP | 362177183 A | | 8/1986 |
| JP | 362177183 A * | | 8/1987 |
| JP | 362183967 A | | 8/1987 |
| JP | 01152217 A | | 6/1989 |

OTHER PUBLICATIONS

EXAIR Air Knife (various models) Installation & Maintenance documents, copyright 2007-2010 by EXAIR Corporation.
"Air Knives" published on http://www.exair.com/en-US/Primary%20Navigation/Products/Air%20Knives/Pages/Air%20Knives%20Home.aspx Internet site, and pages relating thereto on the same site, on Sep. 30, 2009; Evidence of this publication date was obtained from the Internet Archive Wayback Machine, which can be found online at http://www.archive.org.
"Technology" published on http://www.mattson.com/technology.asp Internet site on Feb. 9, 2010; Evidence of this publication date was obtained from the Internet Archive Wayback Machine, which can be found online at http://www.archive.org.
"Vortek Arc Lamp" published on http://www.mattson.com/vortekarclamp.asp Internet site on Apr. 25, 2010; Evidence of this publication date was obtained from the Internet Archive Wayback Machine, which can be found online at http://www.archive.org.
Engineering drawings of EXAIR Air Knife (various models); copyright 1997-2003 by EXAIR Corporation.
"IODS—Weld Cladding, Pipe Cladding, Clad Pipe Fittings and Fabrication" published on http://www.offshore-technology.com/contractors/pipes/iods Internet site on Sep. 27, 2009; Evidence of this publication date was obtained from the Internet Archive Wayback Machine, which can be found online at http://www.archive.org.
"The Use of High Density Infrared Heating for Surface Modification/Coatings Processes" published at http://www.advancedmaterialsassoc.com/PDF-Gallery/oakridge_high_density_infrared_heating_paper.pdf Internet site; The PDF document properties suggest this paper was created Jul. 30, 2004. This document is encrypted, and therefore could not be printed or uploaded via EFS-Web.
1. H. Mizuno, J. Kiamura: MoB/CoCr Cermet Coatings by HVOF Spraying Against Erosion by Molten Al—Zn Alloy, J. Therm. Spray Tech. 16 [3] (2007) 404-413.
2. H.P. LV, J. Wang, C.S. Zhia, F. Li, B.D. Sun: Durability of HVOF Sprayed MoB/CoCr Coating on the 316L Stainless Substrate in Molten 55%Al—Zn—1.5%Si Bath, Thermal Spray 2007: Global Coating Solutions, B.R. Marple, M. M. Hyland, Y.C. Lau, C.J. Li, R.S. Lima, and G. Montavon, Ed., May 14-16, 2007 (Beijing, China), ASM International, Materials Park, OH, USA, 2007, p. 513-517.
John Bruce Neilson, An investigation of a Vortex Stabilized Arc, PhD Thesis University of British Columbia, Sep. 1981; This publication is viewable online at https://open.library.ubc.ca/clRcle/collections/831/items/1.0085771; The publication is encrypted, and is therefore not able to be printed or uploaded via EFS-Web.
Todd A. Palmer, Implementation of Laser Cladding for Virginia Class Submarine Propulsion Shaft Repair, Institute for Manufacturing and Sustainment Technologies, Applied Research Laboratory, Pennsylvania State University, FY2011 Annual Report, p. 7.
Heping LV, Pulin Nie, Yonggen Yan, Jun Wang, Baode Sun, Characterization and adhesion strength study of detonation-sprayed MoB—CoCr alloy coatings on 2Cr13 stainless steel substrate, J. Coat. Technol. Res. 7 (6) 801-807, 2010.
Joseph R. Davis, Nickel, cobalt, and their alloys: ASM Internat'l. Handbook Committee. 2000. p. 267-268.
The Bayou Companies, LLC, ID Coatings web page, published on http://www.bayoucompanies.com/coatings_id.html Internet site of Oct. 6, 2008; Evidence of this publication date was obtained from the Internet Archive Wayback Machine, which can be found online at http://www.archive.org.
The Metallurgy of Alloy 625; Stephen Floreen, Gerard E. Fuchs, Walter J. Yang; In: Superalloys 718, 625, 706 and Various Derivatives; Ed: E.A. Loria; The Minerals, Metals & Materials Society (1994).
High-Density-Infrared Transient Liquid Coatings; C.A. Blue, V.K. Sikka, E.K. Ohriner, P.G. Engleman, D.C. Harper; JOM-e 52(1)(2000)—Jan. 2000.

* cited by examiner

METHOD AND APPARATUS FOR FORMING CLAD METAL PRODUCTS

This application is a National Stage application of International Application No. PCT/US2012/028655, filed Mar. 9, 2012 with the U.S. Patent Office acting as a Receiving Office, which claims priority to, and the benefit of, U.S. Provisional Patent Application No. 61/451,114 filed Mar. 10, 2011 with the U.S. Patent Office, where the present application claims priority to, and the benefit of each such application, and whereby the disclosure of each such application is hereby incorporated by reference.

BACKGROUND OF THE INVENTION

1. Field of the Invention

The invention generally relates the formation of metal cladding upon a target substrate, and particularly to methods and apparatus for forming a cladding using a high energy density fusion cladding process and other variations thereof.

2. Description of the Related Art

There exists an urgent need in the industry for corrosion, erosion and wear resistant clad products, and in particular clad pipes, plates and bars. These products have a wide variety of application in multiple industries including oil and gas, chemical and petrochemical, infrastructure, marine, mining and mineral processing, for example. It has been reported that tens to hundreds of billions of dollars are spent annually to remedy the effects of corrosion in each such industry. Further, the surfaces of these products may also subjected to erosion and wear. For example, such products may be exposed to certain environments or employed to convey particular materials that may promote erosion or wear along an exterior or interior surface of the product.

Several methods and processes have been used to manufacture clad metal, such as co-extrusion, roll bonding, explosion bonding, and weld overlay/laser cladding. These processes, however, are labor intensive, costly, and/or may provide difficulties in obtaining desired cladding on particular products. Accordingly, it is desirable to provide alternative solutions for improved formation of cladding upon desired substrates.

SUMMARY OF THE INVENTION

The present invention generally concerns methods and apparatus for bonding cladding material onto a metal substrate, such as mechanically or metallurgically to a pipe or the like. Particular embodiments of the present invention include a method for metallurgically bonding cladding material onto a metal substrate. Embodiments of such methods include the step of providing a metal substrate comprising a pipe or a tube having a cladding composition arranged along an interior surface of the substrate to form a coated substrate, the interior surface arranged within an interior cavity of the substrate. Such embodiments further include the step of inserting a heat source into an interior cavity of the substrate, the heat source comprising an infrared, microwave, or radio frequency heat source, the heat source being mounted on a heat source-retaining housing, the housing comprising a cantilevered structure. Further steps of such methods include applying heat discharged from the heat source to the coated pipe along the coated interior surface until the cladding composition metallurgically bonds to the interior surface of the pipe.

Particular embodiments of the present invention include an apparatus for metallurgically bonding cladding material onto a metal substrate. Embodiments of such apparatus include a heat source housing, the housing comprising a cantilevered structure, the cantilevered structure including a heat source arranged along a length of the cantilevered structure and comprising an infrared, microwave, or radio frequency heat source. Such embodiments of such apparatus also include a translation device adapted to receive a metal substrate comprising a pipe or a tube, the translation device being translatable relative to the heat source and configured to rotate the substrate relative the heat source.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide methods and apparatus for cladding substrates, such as pipes, plates, and bars, for example. Cladding comprises bonding a cladding or coating to a substrate or base material to form a clad product. Bonding may be achieved, for example, by mechanical and/or metallurgical bonding. Cladding can be valuable when applying cladding to a lower cost substrate to attain the desired properties of any more expensive corrosion resistant alloys, which may offer more optimum corrosion, wear, and erosion resistance. For example, when the substrate is carbon steel, the final product not only exhibits the desired properties associated with the cladding, but also the superior strength, ductility, and weldability characteristics associated with the carbon steel substrate.

The present invention concerns methods and apparatus for forming a clad product. Particular embodiments of such methods may include providing a metal substrate comprising a pipe or a tube having a cladding composition arranged along an interior surface of the substrate to form a coated substrate, the interior surface arranged within an interior cavity of the substrate. Cladding may be formed on any desired substrate. In the embodiment shown in the figures, the substrate is a steel pipe. However, the substrate may comprise any desired form, such as pipe, tube, bar, or plate, for example, comprising any desired material. In particular, the methods and apparatus discussed herein are particular useful to clad the interior surface of any enclosed substrate, that is a substrate where the transverse width and height is enclosed, such as with a pipe or tube, where the pipe or tube has an outer circumference or perimeter enclosing the interior cavity. A substrate may also be used where the substrate is partially enclosed, where a portion of the substrate extends transversely in multiple planes so to define an interior surface, such as with a channel, beam, or any particularly shaped extrusion. By example, the substrate may be formed of a titanium alloy, high strength steel, a high strength low alloy steel, a thermo mechanically processed (work-hardened) heat treated alloy, or an aluminum alloy. Prior to depositing any cladding composition onto the substrate, the substrate surface is prepared to receive the composition using conventional cleaning or surface preparation methods, such as surface blasting.

Upon completion of any surface preparation, the cladding material is deposited on the substrate surface. This may occur prior to processing or during processing. Cladding composition may comprise any desired composition. For example, a cladding composition may form a corrosion resistant alloy, a metal, a fusion bonded epoxy, a ceramic metal composite, a paint, an organic or inorganic protective coating material, a nanocomposite, or an organic or inorganic polymer. Further, a cladding composition may comprise a thermosetting polymer, a thermosetting polymer composite, a thermoplastic polymer, or a thermoplastic polymer composite. By more specific example, cladding composition may comprise a powdered metal and/or organic or ceramer composite, such as a nickel based alloy (such as alloy 625, alloy 825, and alloy 400), stainless steel, metallic glass, aluminum-zinc, or polymer/fusion bond epoxy to steel surfaces. In particular embodiments, the cladding composition comprises a composition disclosed in: (1) International Application No. PCT/US10/35876 filed on May 21, 2010 and published Nov. 25, 2010 as WO 2010/135721; and, (2) U.S. patent application Ser. No. 12/785,397 filed May 21, 2010 and published Nov. 25, 2010 as US 2010-0297432, each of which claim priority to U.S. Provisional Application No. 61/180,530 filed May 22, 2009, all of which are herein incorporated by reference. Cladding composition is also referred to herein as cladding coating, cladding material, and precursor.

Cladding material may be deposited or applied to the substrate using one or more application techniques based according to the specific application. Cladding material may also be deposited in any desired form, such as a powder, slurry, paste, or preformed foil or sheet. In particular embodiments, the preformed foil or sheet may comprise any desired shape, such as a planar sheet, a tube, or the like. Exemplary application methods include electrostatic application, compressed air spray application, inert gas spray application, thermal spray, rolling (compressive bonding), centrifugal casting, fluidized powder, compression and gravity in slurry form, solvent liquefied powder, wiping pig, brushing, tape application, foil application, and mechanical expansion via a sleeve.

Particular embodiments of such methods include applying heat discharged from the heat source to the coated substrate along the coated interior surface until the cladding composition metallurgically bonds to the interior surface of the substrate. In particular embodiments, bonding of the cladding material to the substrate is achieved by application of heat from a heat source that heats an area substantially larger than the area by which welders and lasers produce. The heat source may comprise any known heat source, such as a heat lamp. In particular embodiments, the heat source is a high-density infrared (HDIR) plasma arc lamp. The HDIR lamp is capable of providing pulsed or constant energy and large power densities, up to 2,000 W/cm$^2$ or up to 20,000 W/cm$^2$ or more. In a particular embodiment, arced lamp power densities are between approximately 350 and 5700 W/cm$^2$, although any power density may be employed as desired for a particular application. A means of protecting the heat source may also be employed to protect the heat source from damage that may result during a bonding operation, where the heat source may be subjected to reflective heat, heat by convection or conduction, splatter of material, and/or exposure to undesired gases or fluid. For example, a means for shielding the heat source may be employed that directs a flow of air or gas across the heat source to create a flowing gas barrier between the heat source and the bonding area, which attempts to isolate the heat source from any undesired fluid or material within the bonding area. This gas flow may flow at any rate and have any thickness as desired or as necessary to protect the heat source for any particular application. For example, the thickness may be increased when heat exposure increases and/or the amount of splatter, debris, or contaminants being directed towards the heat source increases.

While the heat source may be configured to apply heat to the clad-coated substrate in any arrangement, in a particular embodiment the heat source is inserted into an interior cavity of the substrate, such as within a pipe or tube, having an interior surface coated with cladding material. To facilitate such arrangement, the substrate and/or the heat source translates relative to the other. In a particular embodiment, the substrate is translated, whereby the substrate is directed to receive the heat source through an end of the substrate during substrate translation. Translation of the substrate ceases once the heat source reaches a desired arrangement relative to the coated interior substrate surface. The substrate may be rotated as well to also facilitate a desired arrangement relative to the heat source. In particular embodiments, the heat source is supported by a cantilevered structure and the substrate by a translation device or conveyor, which may comprise as a trolley for example.

Once properly arranged, the atmosphere or environment surrounding the heat source and/or the coated substrate may be controlled prior to application of heat during any bonding operation. Any known means of controlling or treating the environment may be employed. For example, in particular embodiments, controlling includes injecting a flow of gas into the substrate internal cavity. Furthermore, such gas may comprise any desired gas, including an inert gas, such as argon, or any mixture of gases discharged about the bonding area (i.e., the location where heat is applied to the coated substrate—which is also referred to as the heat-affected zone). Exemplary methods include forming a vacuum or injecting a fluid such as any gas, liquid, or reactive fluid about the bonding area (i.e., the location where heat is applied to the coated substrate). It is understood that an area surrounding the bonding area may be at least partially sealed for improved control, including the ability to retain gas injected into the substrate interior cavity. For example, where cladding is being applied to the interior surface of a pipe, the interior of the pipe may be at least partially sealed and receive any inert gas, such as argon, to control the atmosphere surrounding the bonding area. Accordingly, in particular embodiments, the step of controlling includes forming at least a partial barrier across a transverse width of the substrate interior cavity on each side of the heat source, where the flow of gas is injected between the partial barriers.

As discussed above, the heat source applies heat to the coated substrate to metallurgically bond the cladding material to the substrate. In particular embodiments, cladding material is exposed to high energy density from an infrared thermal source, such as a high energy density infrared (HDIR) plasma arc lamp providing a heat flux (i.e., power density) of 350-5700 W/cm$^2$ or more, or a medium density infrared lamp providing a heat flux of 150-350 W/cm$^2$, each of which may maintain said heat flux for a sufficient amount of time to cause the coating material to flow and to wet the surface of the substrate. In other embodiments, the heat source may comprise any other known heat source known to one of ordinary skill, such as tungsten halogen lamps, induction heat sources, or gas radiant heat sources. In particular methods, the cladding material is exposed to the HDIR plasma arc lamp (or other heat source) at a low power level in order to preheat the material if needed. This low power level can be maintained for sufficient time to allow thermal equilibrium to occur within the cladding material. Upon reaching thermal equilibrium, or at any other desired instance, the HDIR plasma arc lamp (or other heat source) is increased to a desired or preselected higher power level and applied for a desired or preselected duration until a desired bond between the cladding material and the substrate is formed. In particular embodiments, the heat or higher power level remains generally constant over the duration. In other embodiments, the heat or higher power level is applied in pulses for shorter durations. For example, the HDIR plasma arc lamp (or other heat source) is pulsed at a preselected higher level power and for a preselected duration, and then brought back down to a preheat power level or lower and held for a preselected time, each of which may be repeated to apply sufficient amounts of energy in short bursts over large areas as dictated by the heat source. Particular parameters of the infrared thermal source and/or the system may be provided and/or controlled to achieve a desired clad product in any desired application. For example, the thermal flux and/or intensity, the size of the heat source, and the transition speed of the heat source or substrate may be controlled to achieve a desired result. It is understood that heating and cladding may be performed using a single pass or multiple passes, which includes overlapping adjacent passes (such as overlapping a prior pass with a current pass). Furthermore, employing multiple passes may operate as a substitute for pulsing the heat source. In particular embodiments, when supplying sufficient quantity of argon within the substrate internal cavity as contemplated above, the electrical properties are altered such that a short can occur when energizing the HDIR plasma arc lamp within the substrate internal cavity. Accordingly, particular embodiments of such methods provide that the heat source is energized outside the interior cavity, and prior to inserting the heat source within or adjacent to the substrate.

In particular embodiments, rapid heating may also be achieved by radiofrequency (RF) induction operating generally between frequencies of 20-450 kilohertz (kHz). In other embodiments, other known heating sources may be employed for rapid heating, such as a microwave heat source operating generally between 0.3-300 gigahertz (GHz). Further, any combination of heat sources may be employed together or in sequence to achieve the desired heating. For example, radiofrequency (RF), microwave, and/or infrared (IR) heat sources may be employed to provide RF, microwaves, and/or IR heat in a sequential manner. By specific example, the RF heat may be used to preheat a substrate and the IR heat (which may be pulsed) to bond the cladding material to the substrate. According to any method of applying heat contemplated herein, rapid heating may be applied in two or more pulses to enable a specified thermal profile to be obtained. Further, one or more of the pulses may comprise a significantly higher energy/heat flux than is provided by other pulses. For example, one or more pulses may be employed to preheat the substrate or the coating/substrate interface, and a second pulse used to bond the coating to the substrate.

It is understood that the cladding processes generally described above may be achieved in a continuous or discontinuous manner. Further, the cladding process may be applied in series with any other substrate operation, such as substrate forming operations, whereby pipe, sheet, extrusion, or plate is formed according to any known procedure. Furthermore, the cladding composition may be deposited or applied to the substrate during or just prior to heating operations. Even further, prior to applying the cladding composition, the interior surface may be cleaned by any chemical and/or mechanical process, such as by using chemical solvents to clean or etching the surface, or by sand blasting the surface. By further example, the substrate may be quenched or cooled. This may be performed after the substrate is heated and the cladding formed along the substrate. Furthermore, a portion of the substrate may be quenched or cooled while portions of the substrate are being heated and clad. Even further, a portion of the substrate may be quenched or cooled simultaneously with or prior to the portion of the substrate being heated and clad. Quenching or cooling may be achieved by any known means or method, such as by convection (such as by gas or liquid) and/or conduction (such as by contacting the clad substrate with a cool plate).

After forming the clad metal product, the product may be inspected to ensure a product of desired quality has been formed. For example, the cladding may be inspected to determine the presence of any cracks, porosity, or other defects. In particular embodiments, the clad metal product is subjected to non-destructive testing. Non-destructive testing methods may include any known technique, such as electromagnetic testing (ET), infrared and thermal testing (IR), radiographic testing (RT), and ultrasonic testing (UT). Such testing may be real-time testing, such as real time radiographic testing (RTR).

Exemplary embodiments of a cladding device for use in performing such methods are discussed in further detail below.

Figure 1:
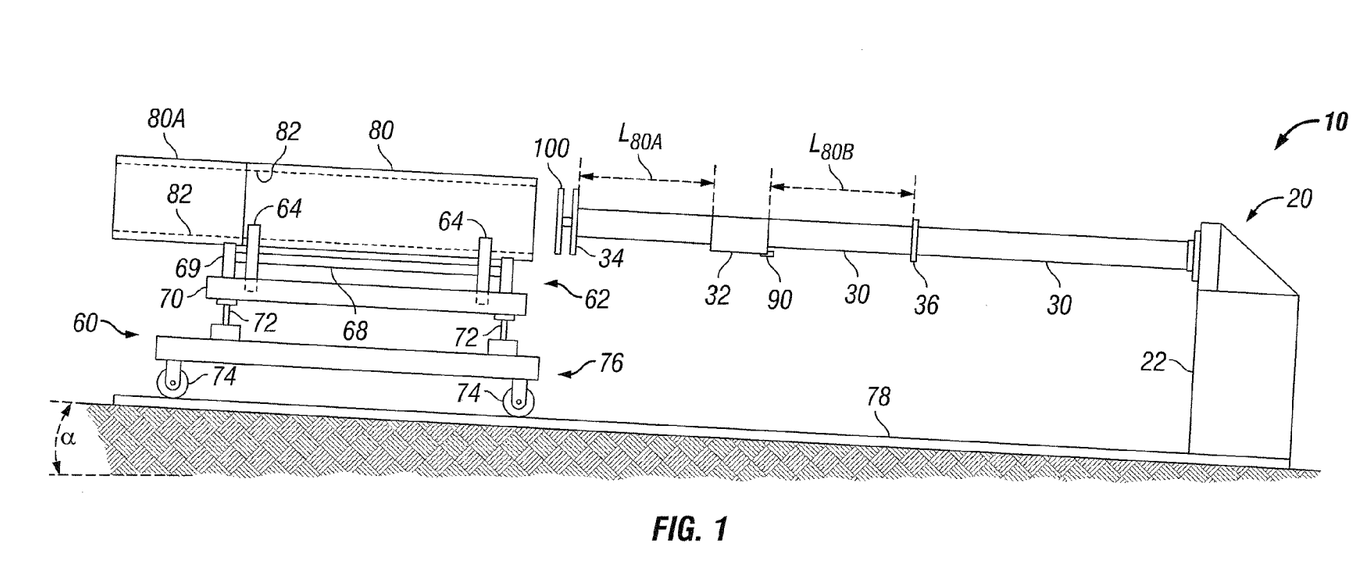
FIG. 1 is a side view of a cladding apparatus or system generally comprising a substrate carriage and a heat source carriage for cladding the interior surface of a substrate, where the substrate carriage is translatable according to an embodiment of the invention.
Figure 2:
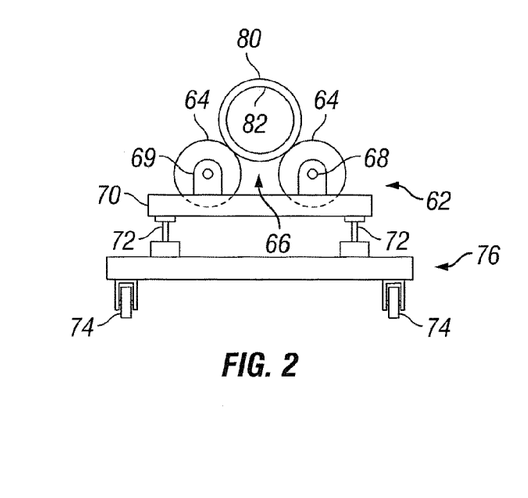
FIG. 2 is an end view of the substrate carriage of FIG. 1, in accordance with an embodiment of the invention.

With reference to FIGS. 1-2, an apparatus or system 10 for use in cladding the interior surfaces of a substrate 80 is shown. Apparatus 10 generally includes a heat source-retaining structure 20 (also referred to as "heat source carriage" for simplicity) and a substrate-retaining structure 60 (also referred to as "substrate carriage" for simplicity), which is also a substrate translation device in the embodiment shown. Heat source carriage 20 includes a heat source 32 for metallurgically bonding (i.e., fusing) a cladding or coating composition 84 to a substrate 80 to form a composite body. In the embodiment shown, substrate 80 is a pipe having a desired length, but the apparatus discussed hereafter in accordance with various embodiments may be used with a tube or any other desired substrate contemplated herein. Accordingly, substrate 80 may comprise any desired substrate contemplated herein, including any tube, beam, extrusion, or channel, including any substrate having an interior surface and/or a transverse cross-sectional shape that is closed (such as with a tube or pipe having an interior cavity) or any transverse cross-sectional shape that is partially closed (such as with a channel or beam).

Figure 15:
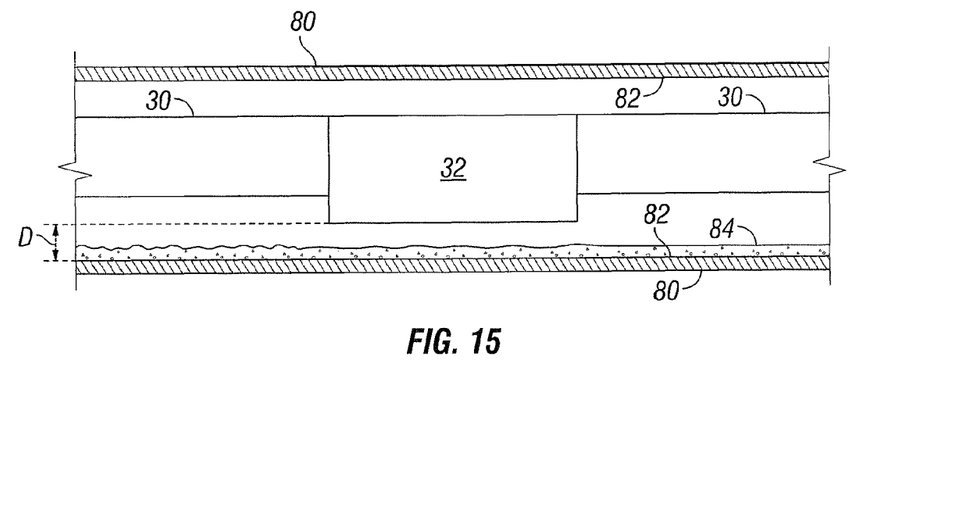
FIG. 15 is a partial cross sectional view of pipe 80 with a cladding composition arranged along an interior bottom surface of said pipe, the heat source being arranged a distance D from said interior bottom surface, according to an embodiment of the invention.
Figure 16:
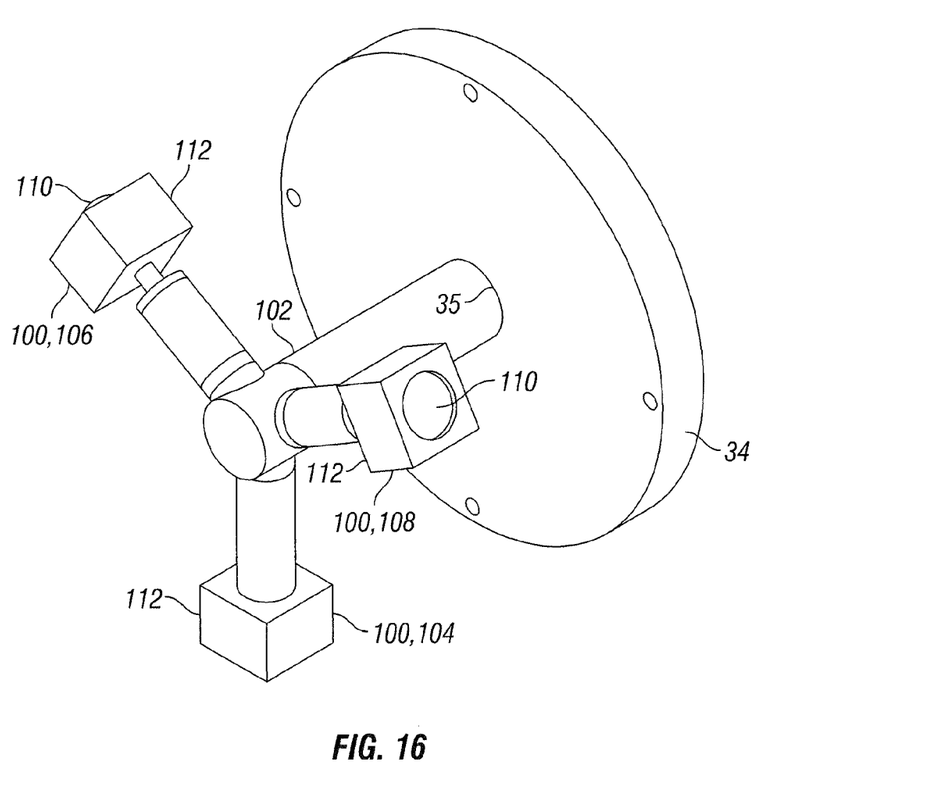
FIG. 16 is a perspective view of a pipe alignment means comprising a plurality of extensions having bearing means arranged at a free, terminal end of each such extension, the extensions extending from a central member operably attached to the first plate of the cantilevered structure, according to an embodiment of the invention.
Figure 17:
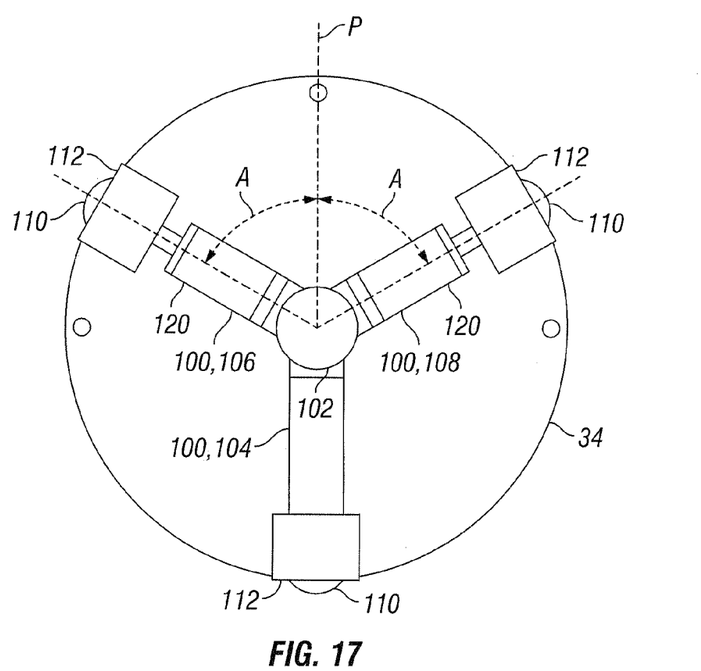
FIG. 17 is an end view of the alignment means of FIG. 16.
Figure 18:
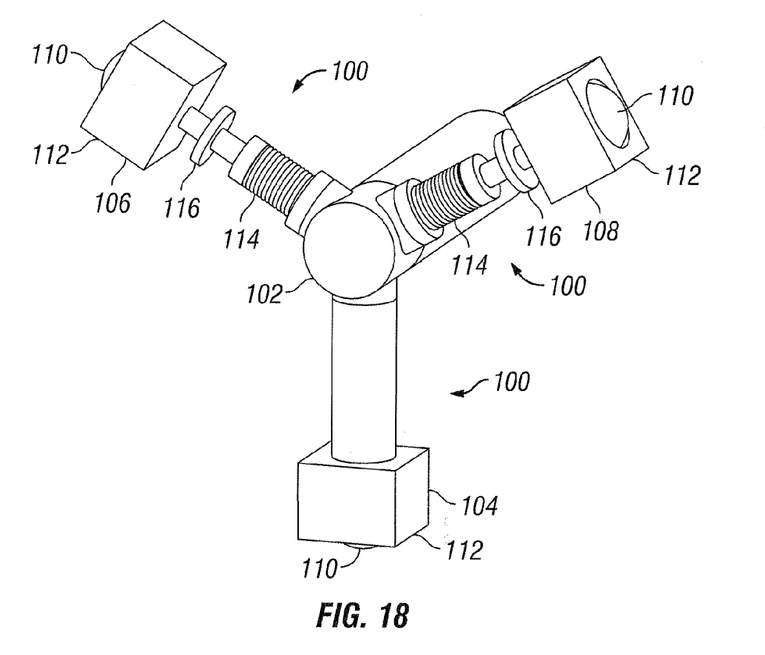
FIG. 18 is a perspective view of the alignment means of FIG. 16, showing the insides of each deformable extension and a deformation member within each such member, according to an embodiment of the invention.
Figure 19:
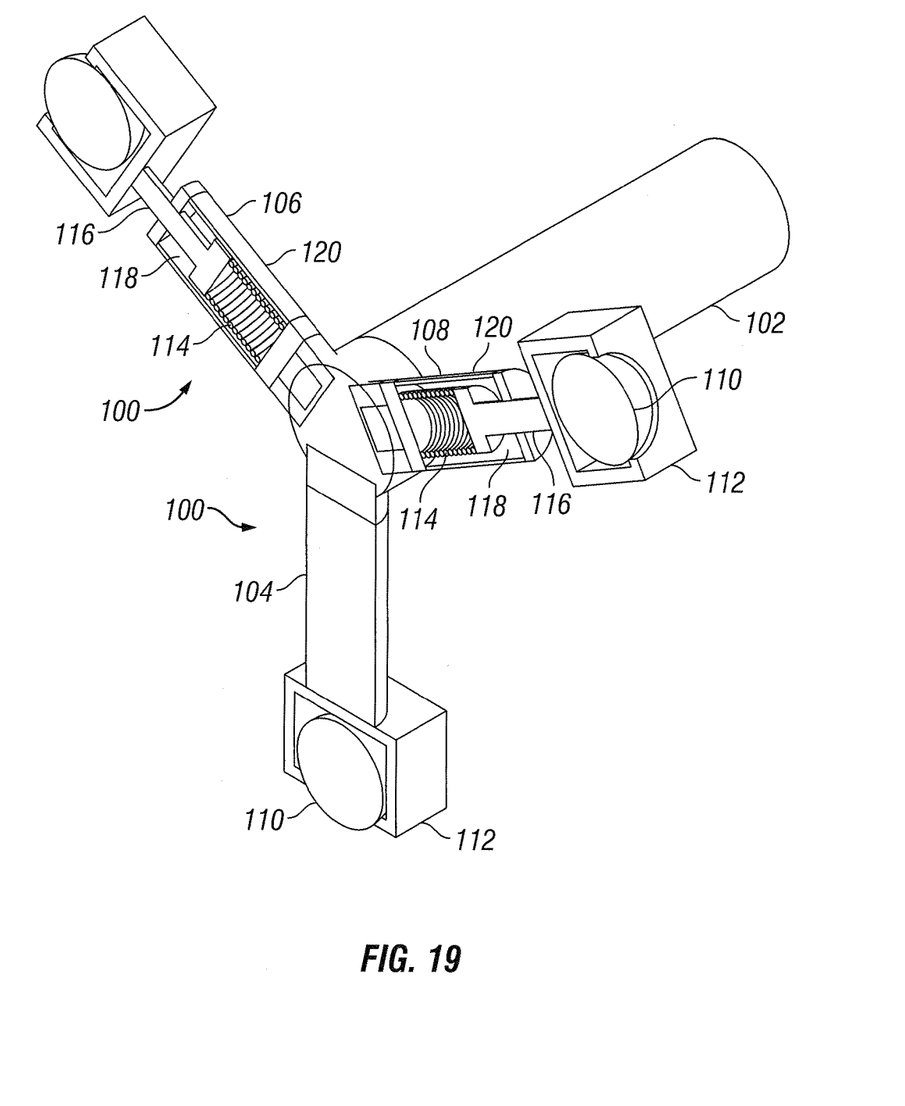
FIG. 19 is a perspective sectional view of the alignment means of FIG. 18, showing the cross section of each extension, where the extensions comprise a pair of deformable extensions and a rigid extension, according to an embodiment of the invention.

Before heat source 32 applies heat to the coated substrate 80, a cladding composition 84 is applied to a cladding surface of substrate 80. With reference to FIG. 15, in an exemplary embodiment, cladding composition 84 is applied to an interior surface 82 of a pipe 80. In the embodiment shown, a portion 84a of cladding composition 84 has been bonded to the substrate, while another portion 84b awaits heating from the heat source. The interior surface 82 may be cleaned or otherwise treated prior to applying the cladding composition. Cladding or coating composition 84 may comprise any desired composition, including the cladding compositions discussed above. Further, coating of the surface may occur before the substrate 80 is plated within system 10, or while within system 10, such as when the substrate enters system 10, while substrate is being translated within system 10 as substrate approaches heat source 32.

With specific reference to FIG. 1, heat source carriage 20 includes a base 22 from which a cantilevered structure 30 extends. Base 22 simply forms any structure capable of supporting cantilevered structure 30. Base 22 may include a control system and/or a power source for operating apparatus 10, including heat source 32. In particular embodiments, cantilever structure 30 is capable of rotating relative to base 22. Accordingly, a shaft or other like device may extend between base 22 and cantilever structure 30 to facilitate rotation of said cantilever structure by a motor. As shown, the cantilevered structure 30 and a substrate translation device 60 are inclined relative a ground plane by angle α, whereby the cantilevered structure extends from base 22 such that the heat source 32 is effectively cantilevered from the base, the cantilevered structure extending at an inclination α relative to the base or the ground plane whereby the free end of the cantilevered structure is elevated above the opposing end of the cantilevered structure, which is operably connected to the base. It is understood that the inclination may comprise any desired angle α. For example, in particular embodiments, inclination angle α is approximately 5 degrees, 0 to 5 degrees, or 5 to 10 degrees or more. Furthermore, at least a portion of the cantilevered structure and the heat source is arranged within the coated substrate, the coated substrate being arranged at an inclination similar to the inclination of the cantilevered structure. By providing such inclination, unwanted gases and smoke may better escape the substrate interior cavity, and, because more weight is applied to the inclined substrate translation device, the device is more responsive and better able to move more fluently with lag due to the tension placed on any chain, cable, or other means used to drive the translation device.

With continued reference to FIG. 1, cantilevered structure 30 extends in a lengthwise direction from one end operable attached to a base 22 to a free end, and includes a heat source 32 for applying heat to a substrate 80 upon which a cladding composition 84 is applied or coated. Cantilevered structure 30 is a structure formed according to sound engineering principles to support the heat source and all other components attached to the cantilevered structure 30. For example, cantilevered structure 30 may include a plurality of trusses, beams (including I-beams), pipes, tubes, and/or channels arranged along the length of structure 30. It is understood that structure 30 may also be formed of any suitable material, including steel for example, by any known process, such as welding or by use of fasteners, for example. The cantilevered structure 30 may be pre-stressed, meaning that the beam is formed such that it curves upward from the base 22 to the cantilevered end so that when it is installed onto the base with the heat source and all other components or otherwise becoming loaded, the terminal end of the cantilevered structure will be suspended elevationally as desired.

Figure 3:
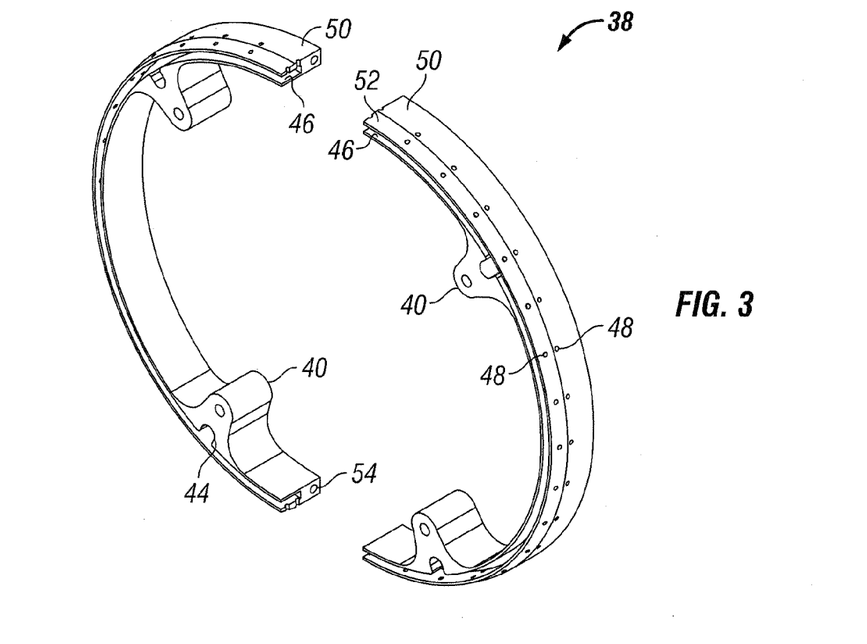
FIG. 3 is a perspective exploded view of a gas discharging ring of the heat source carriage of FIG. 1, according to an embodiment of the invention.

In particular embodiments, apparatus 10 is capable of controlling the atmosphere within or along the substrate during the cladding operation. More specifically, with regard to the embodiment shown, heat source carriage 20 includes means for controlling the atmosphere within the pipe and at least in the vicinity of the heat source 32. In particular embodiments, the means for controlling comprises gas outlets arranged on or between the enclosure members arranged to discharge gas between the heat source and the interior surface of the substrate. Such gas outlets may be arranged at any location along the length of structure 30. In further embodiments, which may or may not include gas outlets, the means for controlling includes forming at least a partial barrier across a transverse width of the substrate interior cavity on each side of the heat source, where the flow of gas is injected between the partial barriers. In particular embodiments, the partial barriers formed on opposing sides of the heat source comprise a pair of enclosures (also referred to as enclosure members) each arranged on opposite sides of the heat source along the length of the cantilevered structure and configured to extend at least partially across the transverse width of the substrate interior cavity. In more specific embodiments, at least one of the enclosures including outlets for discharging a flow of gas into the atmosphere surrounding the heat source and at least apportion of the cladding composition arranged along the interior of the pipe. For example, with continued reference to FIGS. 1-3, heat source 32 is arranged between a first enclosure 34 and a second enclosure 36 along the length of cantilevered structure 30. First enclosure 34 and second enclosure 36 generally radiate outwardly (i.e., extend in a direction generally perpendicular to the lengthwise direction of structure 30) from the cantilevered structure 30 and extend around said structure 30 to generally provide a seal when arranged within pipe 80 for the purpose of isolating the atmosphere within the pipe from the atmosphere outside the pipe. However, it is understood that each enclosure 34, 36 may not be sized identically to the inside dimensions of each pipe 80 within which each is employed. Accordingly, an allowable gap may exist between the interior surface of the pipe 80 (which may have cladding composition arranged thereon) and the outer extents of the enclosure 34, 36. This allows a enclosure 34, 36 to be used with an acceptable range of differently sized pipes, as well as accounting for any variations in pipe manufacturing. If the anticipated gap is too large to adequately maintain the desired atmosphere within the pipe, a differently sized enclosure may be used to achieve the proper sealing capabilities.

Figure 4:
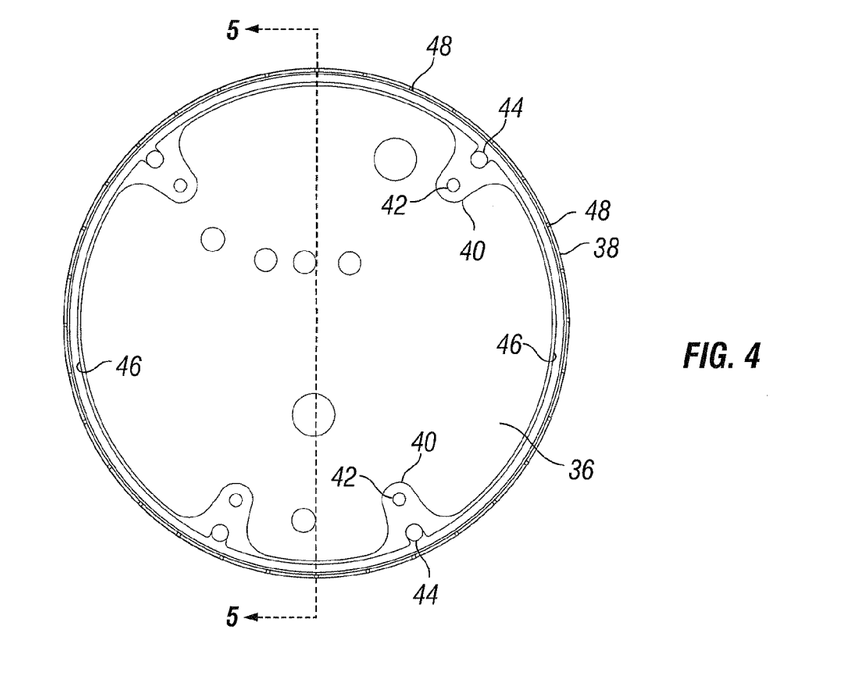
FIG. 4 is a front end view of the ring of FIG. 3 shown assembled and attached to a second plate of the heat source carriage of FIG. 1, according to an embodiment of the invention.
Figure 5:
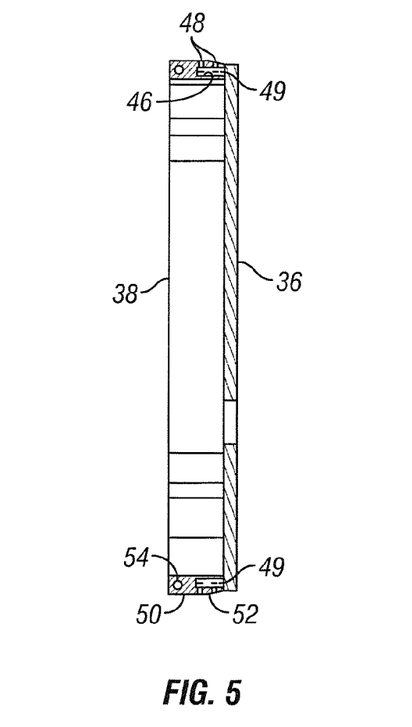
FIG. 5 is a section view of the gas discharging ring taken along line 5-5 in FIG. 4, according to an embodiment of the invention.
Figure 6:
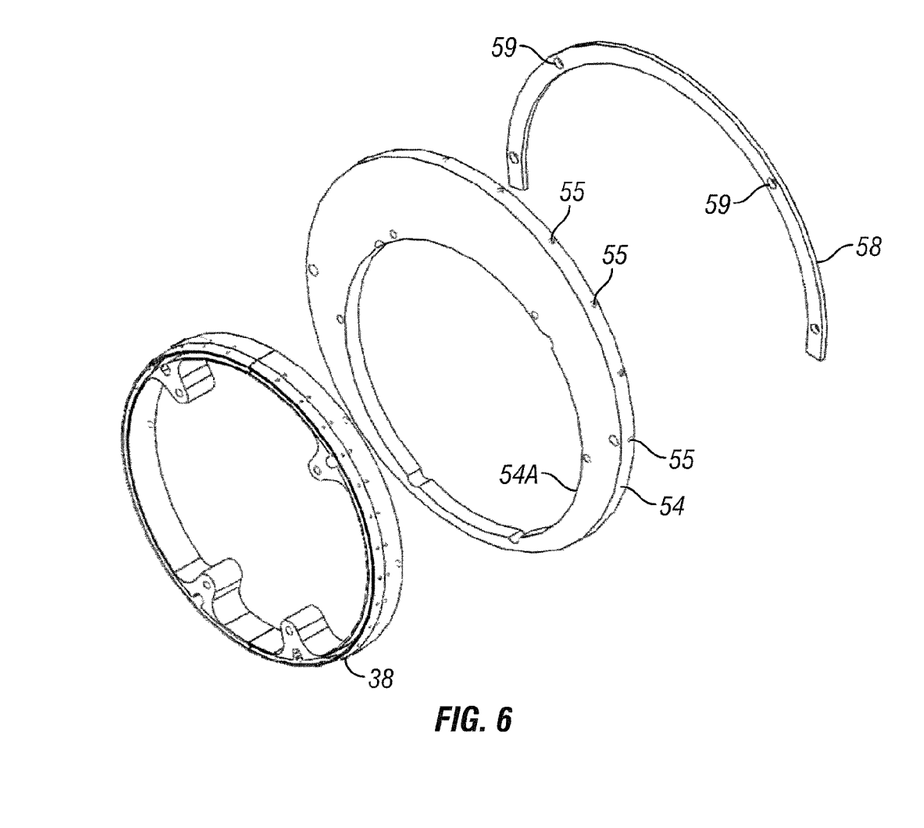
FIG. 6 is a perspective exploded view of the gas discharge ring of FIGS. 3-5 shown in association with a secondary gas discharge member in accordance with a further embodiment of the invention.

It is understood that enclosures 34, 36 may be formed of any suitable structure, such as a plate, extrusion, or sheet, and any suitable material, such as steel, for example, and may be formed by any known manufacturing method. Further, second enclosure 36 may include various apertures through which a pipe, tubing, wired, and/or buses travel to communicate power, gases, liquids, and control circuitry, for example, to and from the heat source arranged between enclosures 34, 36. In the present embodiment, any input or output of the heat source 32, such as waste discharge, is routed through apertures within the second enclosure 36 (which are exemplarily shown in FIG. 4) and not the first enclosure 34 so that all input and output to heat source is routed through one side of the cantilevered structure, such as through the side or end opposite the free end of the cantilevered structure. More generally, the input and output of the heat source 32 is routed away from the free (or terminal) end of structure 30 to allow any pipe to enter and exit structure 30 without interference.

In the exemplary embodiment shown in FIG. 1, structure 30 has a length that is at least as long as a substrate 80 (such as the pipe shown, for example) to be clad by system 10. In particular embodiments, the length between enclosures 34, 36, is at least equal to the length of the substrate. When structure 30 is at least as long pipe 80, the entire length of pipe 80 may be exposed to heat source 32 and bond cladding composition 84 along such length. This allows a pipe 80 that is installed heat source 32 to travel from a first end of the pipe to a second end of the pipe for the purpose of coating a full length of the pipe. In the exemplary embodiment, first and second enclosures 34, 36 are spaced from heat source to protect the enclosures from the heat discharged by the heat source. Therefore, when the pipe is installed along the cantilevered structure 30 and a first end of the pipe is arranged adjacent the heat source 32, the first enclosure 34 is spaced from the first pipe end. Accordingly, to allow first enclosure 34 to sufficiently separate the exterior environment from the pipe interior while the heat source 32, a substrate extension 80A is attached to the first end of pipe 80. To achieve its purpose, the extension 80A has a length at least as long as the distance between the heat source 32 and the first enclosure 34, which is referred to as length $L_{80A}$. For the same purpose, a second extension (not shown) may be arranged opposite the first extension along the second end of pipe 80, so to extend between the second pipe end and the second enclosure 36 for the purpose of separating the exterior environment from the pipe interior when the heat source 32 is arranged at the second pipe end. Accordingly, the second extension has a length at least as long as the distance between the heat source 32 and the second enclosure 36, which is referred to as length $L_{80B}$. To reduce the length of each extension, the enclosures may be arranged closer to the heat source. In the alternative, a longer length pipe may be employed, where portions at the first and second ends are not clad and cut from the clad portions to provide a final clad pipe. Each extension may be releasably secured to the pipe, such as by way of fasteners. In other variations, the extension is welded to the pipe and later cut after the pipe has been clad.

Heat source 32 may comprise any desired heat source, such as a heat lamp, for example. In the embodiment shown in FIGS. 1 and 10, heat source 32 is an infrared (IR) plasma arc lamp, which may be a medium density infrared lamp or a high density infrared (HDIR) lamp as discussed previously. IR plasma arc lamp 32 includes a reflector 32a and an anode and cathode (not shown) arranged on opposing sides of the reflector 32a. In the embodiment shown, heat is discharged from heat discharge opening 33 arranged along a bottom side of reflector 32a toward an interior bottom surface 82 of the pipe 80. As discussed previously, however, heat source 32 may comprise any other known heat source or combination of heat sources discussed above capable of achieving the cladding operations discussed herein, and, as well may include multiple discharge openings. The heating process utilizing the HDIR plasma arc lamp is capable of quickly delivering large amounts of controlled heat over large surface areas with little or no detrimental influence on the substrate (i.e., the base material). Pulses of infrared energy from the HDIR arc lamp can be as short in duration and/or periodicity as the physical limitations of the device that produces the plasma arc, in a manner that allows precise control various process parameters, such as work-piece surface temperature. The heating process can be carried out in a controlled environment between enclosures 34, 36. The controlled environment may comprise a vacuum or contain a particular air, liquid, inert fluid, or reactive fluid, for example, or any other type of environment needed for processing. A means for quenching or cooling the pipe or substrate after heating during the bonding process is contemplated and may be arranged along an outer surface of the pipe, where such means may be mounted to either carriage 20, 60 or another structure.

Apparatus 10 may include a means for controlling the environment along the substrate for application heat and performance of cladding operations. For example, with reference to FIGS. 1, 3-9, in particular embodiments of the invention, means for controlling the environment comprises a means for discharging gas, which may comprise any gas discharging device such as gas discharging ring 38, for example, to assist in controlling the environment within pipe 80. Ring 38 includes at least one gas inlet 44 and a plurality of gas outlets 48 for the distribution of gas into pipe 80. In the embodiment shown, outlets 48 comprise cylindrical openings. In other variations, outlets 48 may comprise any one or more other sized and shaped opening, including as one or more slits. Gas may be injected into pipe 80 for the purpose of controlling the inside atmosphere and operating as a shielding gas during the fusion process of the cladding material. For example, argon may be discharged from ring 38 as a shielding gas. Gas inlets 44, shown adjacent apertures 42 along tabs 40 for receiving mounting fasteners, are in fluid communication with a gas distribution channel 46 extending annularly around ring 38. In embodiments shown, the gas discharging ring 38 is arranged in conjunction with second enclosure 36, which is used to close channel 46 for the purpose of forming a gas distribution passage 49 for directing the gas from the inlet 44 to each outlet 48. It is understood that any other ring design and arrangement may be employed which provides at least one gas inlet, a plurality of gas outlets, and at least one gas distribution passage in fluid communication with both an inlet and an outlet—whether or not such ring is arranged in conjunction with a enclosure 34, 36 or any other component.

Gas outlets 48 are shown arranged generally near the outer radial extents or sides of the ring 38. Gas outlets may be arranged to provide laminar or non-turbulent flow. The gas is discharged in this arrangement to account for any gap between the enclosure/ring and the pipe. More specifically, a first arrangement of outlets 48 are shown arranged along a first outer surface 50 arranged along the outermost extend or side of ring 38, the surface generally extending in an axial direction of the ring. The outlets 48 of first surface 50 primarily direct gas outwardly in a generally radial direction and into the vicinity of any gap existing between any pipe 80 and the enclosure 36 and/or ring 38 for the purpose of preventing or reducing the influx of any external atmosphere. A second surface 52 arranged more inward from the first surface 50 directs flow in a more inward direction of pipe 80 (i.e., toward the heat source 32) for the purpose of filling the interior of the pipe with the discharged gas at least partially or even fully. In the embodiment shown, the second surface 52 is an inclined surface, whereby the surface extends radially inwardly from an outer location of the ring to a more central location of the ring. It is understood that any desired ring design may be employed consistent with this invention, where such ring may include any desired arrangement of outlets and surfaces. Ring 38 may be formed of any desired material, such as aluminum or steel, and may be formed by any known process, such as casting or machining. In the embodiment shown, the ring 38 is formed of multiple sections and employs apertures for receiving guide pins to assist in the alignment of adjacent sections during ring assembly.

Figure 7:
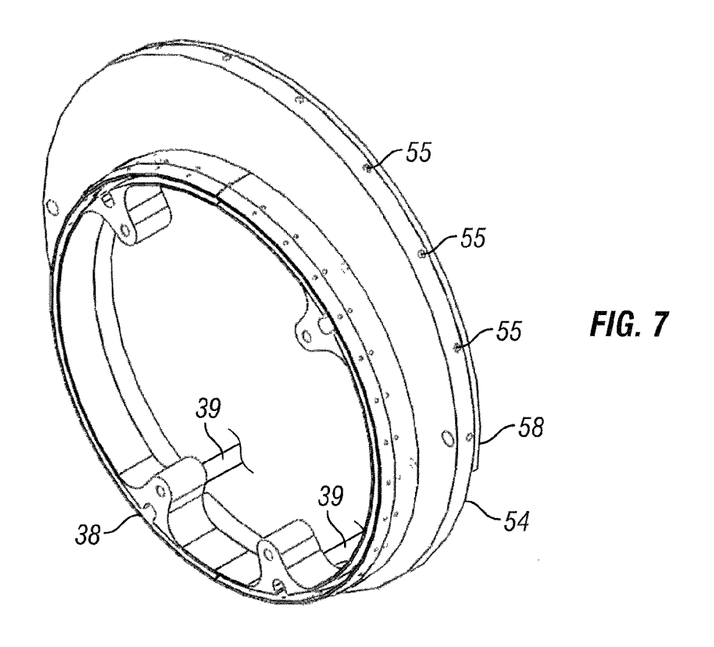
FIG. 7 is an assembled view of the gas discharge ring and the secondary gas discharge member shown in FIG. 6.
Figure 8:
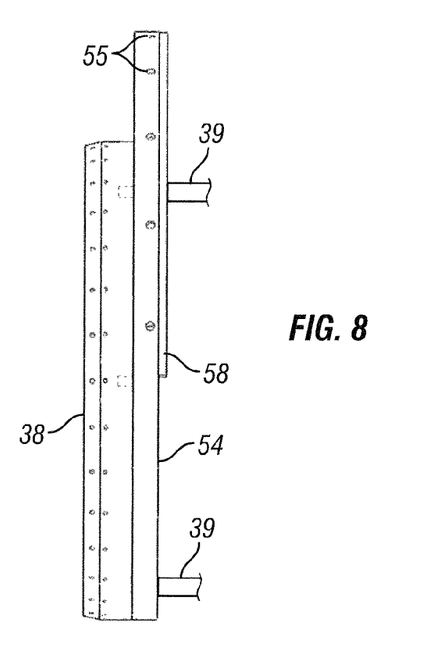
FIG. 8 is an side view of the assembly shown in FIG. 7.
Figure 9:
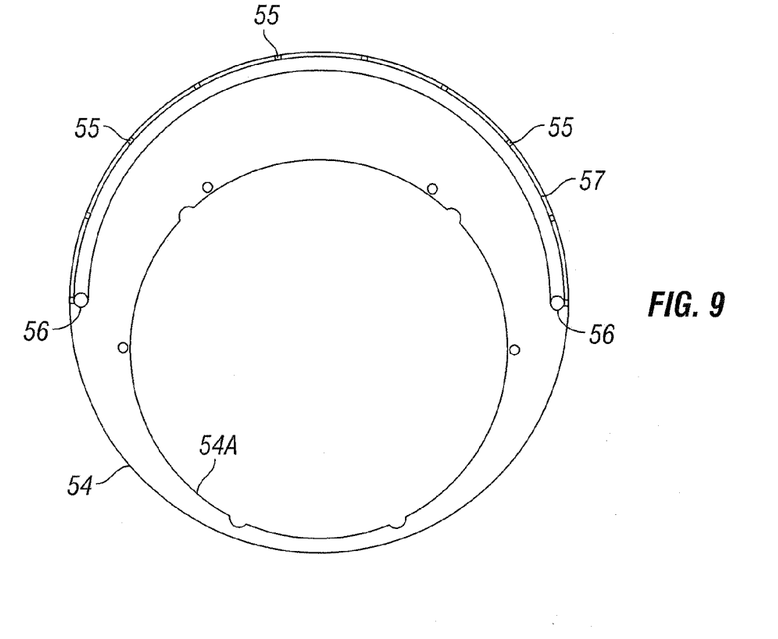
FIG. 9 is a rear end view of the secondary gas discharge member with the cover removed to show a fluid passage extending from fluid inlets to fluid outlets in accordance with a particular embodiment of the invention.

In an effort to accommodate differently sized substrates, a differently sized ring 38 may be employed. In further embodiments, when accommodating a substrate having a transversely larger interior cavity (that is, a taller and/or wider internal cavity), one or more additional gas outlets may be arranged radially outward the ring to accommodate the larger interior cavity. Similarly, in any such instance, differently sized transverse barriers, such as enclosures 36, may be employed when accommodating differently sized substrates. For example, when accommodating larger interior cavities, a larger barrier may be provided by substituting a larger barrier for the smaller barrier, or one or more extensions may be added to the smaller barrier. For example, with reference to FIGS. 6-9, a secondary member 54 (also referred to as an extension) is shown attached to a ring 38, where the member is annularly shaped and includes a plurality of gas outlets 55 spaced radially outward from the ring. The gas outlets 55 extend from a channel 57 formed into a back side of the secondary member between gas inlets 56. The channel is enclosed by cover 58, which includes apertures 59 for receiving a gas input line, the apertures being aligned with inlets 56 along member 54. Secondary member also operates to form a larger barrier, and may be provided whether or not secondary member includes gas outlets 55. With reference to FIGS. 7 and 8, gas supply lines 39 are shown operably attached to ring 38 and secondary member 54, and in particular gas inlets 44 and 56, respectively.

As discussed above, a means for protecting the heat source from potential damage that may result during a bonding operation, such as due to reflective heat or due to the present of certain gases, contaminants, splatter, or other projectiles, may be provided. Any means for protecting the heat source may be employed, including a means for shielding the heat source that directs a flow of air or gas across the heat source to create a barrier between the heat source and a particular environment. With reference again to FIGS. 1, 10, and 12, the particular embodiment shown provides a means for shielding the heat source comprising a gas shielding device 90, which is arranged adjacent the heat discharge opening 33 of heat lamp 32. Shielding device 90 receives pressurized gas that is then distributed outwardly through outlet 96 and thereby discharges a flow of gas across the heat discharge opening 33 of the lamp to protect the interior of the lamp by deterring or preventing entry through the outlet 96. The flow of gas may be discharged in any direction across the discharge opening. In the embodiment shown, the gas flow is directed in a lengthwise direction of discharge opening 33 along opening length $L_{33}$. By further example, shielding device 90 may be directed transversely across discharge opening 33 in a widthwise direction of the opening along opening width $W_{33}$. In particular embodiments, the flow of gas is controlled to provide a laminar flow of gas. This flow of gas provides a fluid barrier (of moving gas) between the environment and the inside of the lamp accessed through the discharge opening. The flow of gas is intended to protect the heat lamp or heat source from any material, fluid, or other gases resulting from the bonding process (as discussed in further detail above). The gas discharged from shielding device 90 may comprise any desired gas, including any inert gas such as argon.

Figure 10:
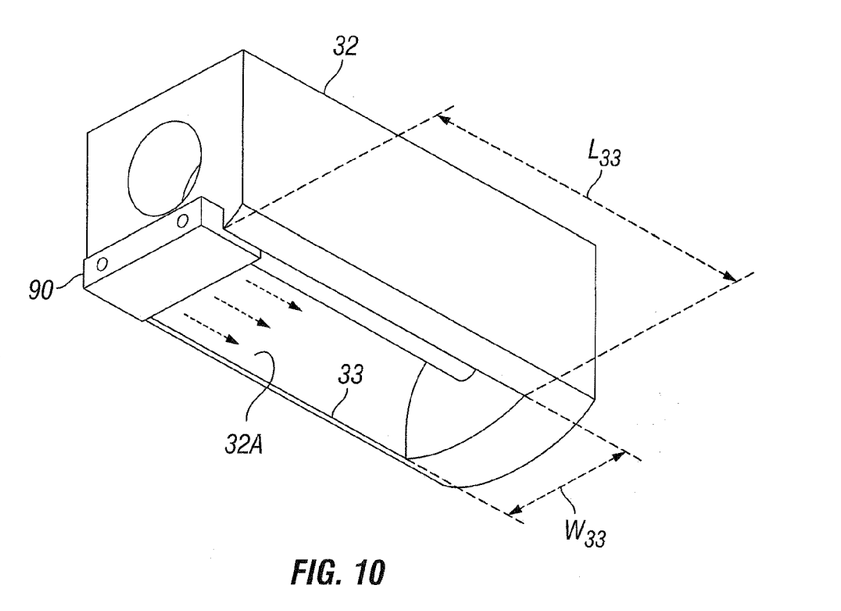
FIG. 10 is a perspective view of a heat lamp and gas shielding device from the heat source carriage in FIG. 1, according to an embodiment of the invention.
Figure 11:
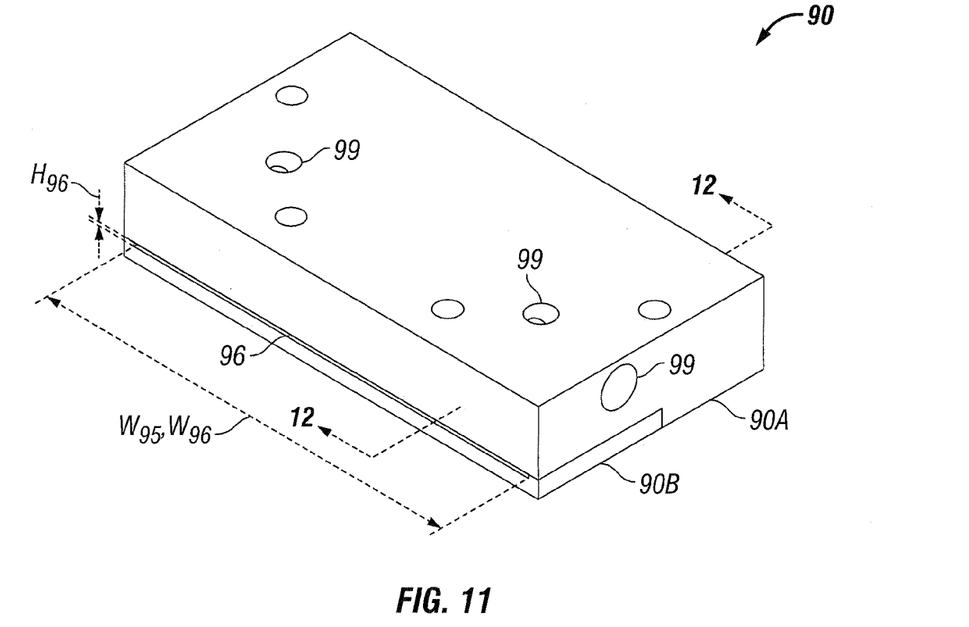
FIG. 11 is a perspective view of the gas shielding device of FIG. 10, according to an embodiment of the invention.

The means for shielding the heat lamp or heat source may comprise any desired method, system, or apparatus. With specific reference to FIGS. 11-14, the shielding device 90 includes gas inlet 92 and gas distributing cavities 94 extending between inlet 92 and outlet 96. Cavities 94 expand in width as each extend in length or depth outwardly toward outlet 96 to provide a maximum width $W_{94}$. In the embodiment shown, expansion in cavity width along sidewalls 94a occurs linearly, but in other embodiments, such expansion may occur non-linearly. For example, in lieu of extending linearly, the cavity sidewalls 94a extend along a non-linear path, including any curvilinear, concave, or convex path. Further, outlet 96 has a width $W_{96}$ sufficient to create a gas flow of sufficient width as desired to span heat source 32. While the width of outlet is shown to be approximately equal to the final expanded width of the combined cavities 94, the width of outlet 96 may be wider or narrow than the width of cavities 94 (that is, the combination of cavities 94), or of any single cavity 94 when only once cavity 94 is provided. The height $H_{96}$ of outlet 96 is sufficiently sized to produce a gas flow of desired quality and character, which may, for example, provide a laminar gas flow. Outlet 96 has a height that is shorter than the height of cavities 94, although, in other embodiments, the height of the outlet maybe equal to, or even larger than the height of cavities 94. It is understood, however, that one or more shielding devices may be employed and arranged in any relation to discharge opening 33. For example, the device of FIG. 10 is arranged to direct flow in a widthwise direction of discharge opening 33 spanning the opening width $W_{33}$, such that the width of the air flow is directed across the opening length $L_{33}$. Accordingly, it is understood that the width $W_{96}$ of outlet 96 may span any desired distance. For example, outlet width $W_{96}$ may be approximately equal to or greater than a width $W_{33}$ of heat source discharge opening 33. Furthermore, when more than one shielding device 90 is employed to create the width of a flow barrier, the width of each shielding device may be selected such that the sum of all the widths $W_{96}$ of the plurality of shielding devices is approximately equal to or greater than the flow barrier width—which may be less than, greater than, or equal to the width $W_{33}$ or length $L_{33}$ of the heat source discharge opening 33. For example, in particular embodiments, the width $W_{96}$ of outlet 96 is approximately 3 inches, which is approximately equal to the heat source discharge opening width $W_{33}$, which is equal to 3.285 inches. In such instances, for example, the height $H_{96}$ of the outlet is equal to 0.002 inches to 0.020 inches. In it understood that outlet height $H_{96}$ may comprise any distance, and, may be selected (increased or decreased) as desired to adjust the flow rate and/or the thickness of the flow barrier. While any desired flow rate may be employed, exemplary flow rates discharged from shielding device 90 range from 10 to 100 standard cubic feet per hour (SCFH). In other examples, the shielding device may comprise an air knife or a blower.

Figure 12:
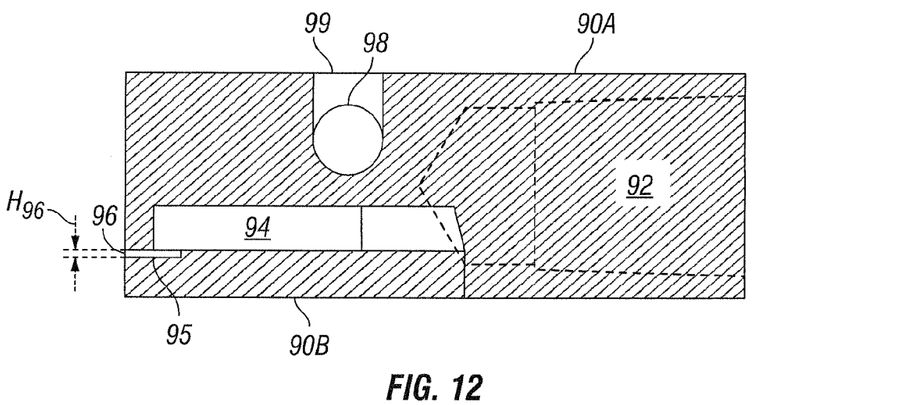
FIG. 12 is a perspective view of the gas shielding device of FIG. 11 taken along line 12-12, according to an embodiment of the invention.
Figure 13:
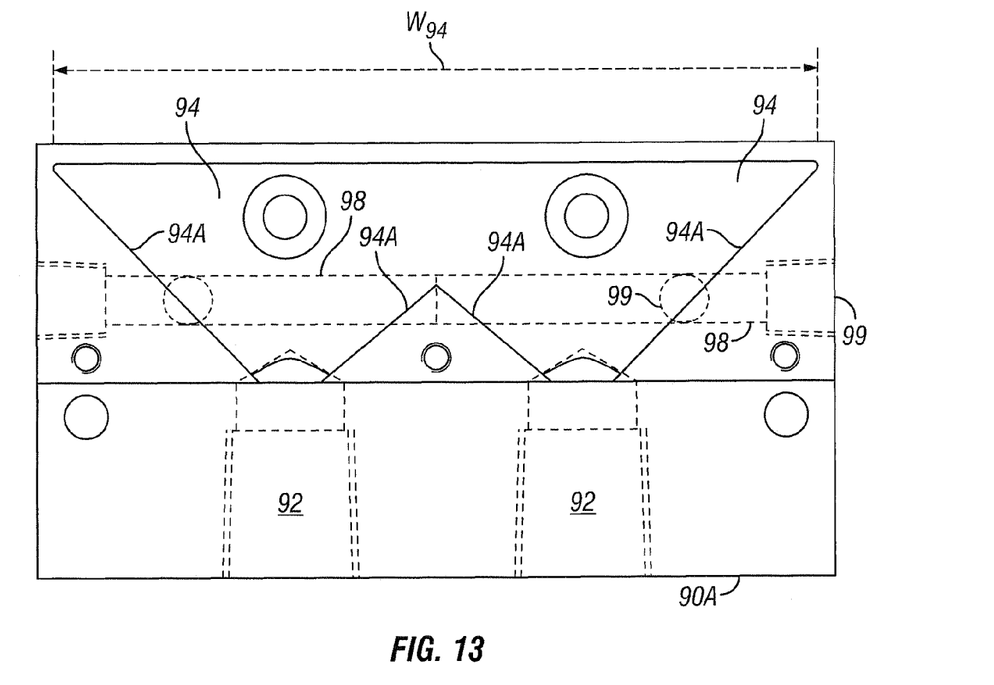
FIG. 13 is a bottom view of a first portion of the gas shielding device of FIG. 11, according to an embodiment of the invention.
Figure 14:
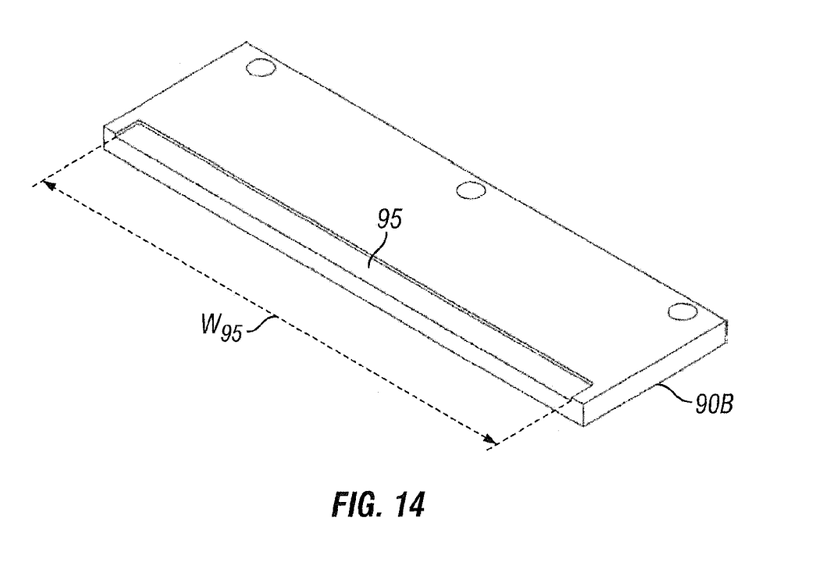
FIG. 14 is a perspective view of a second portion of the gas shielding device of FIG. 11, according to an embodiment of the invention.

With reference to FIG. 12, a intermediate cavity 95 extends between cavities 94 and outlet 96. In particular, intermediate cavity 95 is arranged adjacent outlet 96 and recessed or offset below cavities 94. Cavity 95, as shown, has a width $W_{95}$ equal to the final width $W_{94}$ of cavities 94, although it may be larger or smaller as desired. This arrangement may be employed to control the flow of gas from outlet 96, although it is understood that control of the flow may be achieved when intermediate cavity 95 extends elevationally from a location within the height of any cavity 94 or above any cavity 94. Likewise, if outlet 96 has a height equal to cavities 94, the intermediate cavity 95 is either not present or forms a portion of the cavities, or an extension thereof. Because the shielding device 90 may be closely located to the heat source, cooling conduits 98 having ports 99 are provided for coolant to travel during bonding operations to protect shielding device from excessive heating. In the embodiment shown, device 90 is assembled from multiple portions, namely, a first portion 90A and a second portion 90B.

As suggested above, a means for translating or moving the substrate may be provided. Such means may comprise any method, system, or translation device capable of translating the substrate relative the heat source. Such means may comprise, for example, a translation device comprising a conveyor belt, a series of rollers, or any other known means for transporting or conveying an object. By further example, with specific reference to FIGS. 1-3, translation device comprises a substrate carriage 60 including a substrate retention subsystem 62 for receiving and retaining substrate 80. Retention subsystem 62 may comprise any desired form capable of retaining any desired substrate 80 within carriage 60. In the embodiment shown, retention subsystem 62 includes a plurality of wheels 64 (or rollers), and in particular two (2) pairs of wheels 64, arranged to receive and retain a pipe 80 in a cradle-like arrangement, where a first pair of wheels are spaced laterally from a second pair of wheel to create a substrate receiving area 66. In the embodiment shown, each pair of wheels share an axle 68 and are mounted to a first base structure 70. It is understood that any wheel, and in particular at least one of the wheels 64 of any pair may be driven to rotate pipe 80 as desired. Any such wheel may be driven by any known means, such as a motor.

In particular embodiments, retention subsystem 62 may be raised or lowered as desired to adjust the spacing and alignment of the substrate 80 relative to the heat source carriage 20 and heat source 32, which may facilitate proper alignment of pipe 80 along cantilevered structure 30 and provide a desired spacing between the heat source 32 and the substrate 80 for desired bonding operations. Accordingly, an elevational (or vertical) adjustment means 72 for raising or lowering retention subsystem 62 may be employed, which may comprises any known raising or lowering means known to one of ordinary skill in the art. For example, elevational adjustment means 72 may comprise hydraulic or pneumatic cylinders, or screw devices used to adjust the vertical arrangement of retention subsystem 62 and of substrate 80. It is understood that at least a portion of heat source carriage 20 includes means for adjusting its vertical arrangement relative to substrate 80.

Carriage 60 may include a translation means 74 to facilitate translation of substrate 80 relative to heat source carriage 20. Translation means 74 are shown to comprise wheels operably attached to a second base 76 of carriage 60. At least one of the wheels may be driven in particular embodiments. In other embodiments, however, translation means 74 may comprise any other means of translating carriage 60 known to one of ordinary skill in the art. It is understood that substrate carriage 60 may remain fixed while heat source carriage 20 is translatable to facilitate relative translation between substrate 80 and heat source 32.

To assist in maintaining proper pipe alignment relative to cantilevered structure 30, a means for aligning the substrate relative the heat source-retaining structure 20 may be employed. Such means for aligning may also operate to further support the cantilevered structure 30. It is understood that the means for aligning may comprise any method, system, or apparatus for aligning the substrate relative the heat-source retaining structure, including the heat source retained therein. For example, such means for aligning may comprise an air bearing or an magnetic levitation device. By further example, with reference to FIGS. 16-19, means for aligning may comprise an alignment means comprising one or more extensions 100 extending radially from structure 30 to engage the inside surface 82 of pipe 80. By utilizing one or more extensions 100, the spacing between pipe 80 and the heat source 32 is better controlled, such as when the pipe dimensions vary due to manufacturing variations. In the embodiment shown, a first extension 104 extends downwardly a desired distance from a central member 102, the distance selected to space an inside surface from the heat source by a distance D (shown in FIG. 15). Distance D may be adjusted based upon a thickness of cladding composition 84 arranged along surface 82. Second extension 106 and third extension 108 extend upwardly from central member 102 biased by an angle A in opposite directions from a vertical plane P extending longitudinally along the length of structure 30. While extensions 104, 106, 108 are arranged symmetrically about vertical plane P, such extensions may be arranged asymmetrically about vertical plane P or around the origin from which angle A extends. For example, the angle A may be different between one or more extensions 104, 106, 108. In the present embodiment, central member 102 extends axially along structure 30 from first enclosure 34. First enclosure 34 may include an aperture 35 for receiving central member 102 for operable attachment of said central member. Central member 102 may or may not extend along a central axis of structure 30. Likewise, aperture 35 may or may not be arranged along a central axis of first enclosure 34 and/or a central axis of structure 30. It is understood that one or more extensions 104, 106, 108 extending in any desired direction may be employed in other variations. Further, extensions 104,106,108 may not extend from central member 102 and may instead extend from any other portion of structure 30, such as between first and second enclosures 34, 36, for example.

With continued reference to FIGS. 16-19, each of the extensions 104, 106, 108 include a bearing means 110 arranged at the terminal ends thereof for engaging the interior pipe surface 82. In the exemplary embodiment shown, the bearing means is a rotatable ball bearing maintained within a bearing housing 112. In the alternative, bearing means may comprise any known means for facilitating a translation differential between the pipe 80 and structure 30 while the corresponding extension engages the pipe. In the present embodiment, the second and third extensions 106, 108 are radially displaceable to account for variations in the pipe dimensions. Accordingly, a forced or biased displacement member 114 is arranged along second and third extensions to facilitate displacement of each bearing means 110. Displacement member 114 may remain free to radially displace bearing means as necessary to account for any dimensional variations in pipe 80. In the embodiment shown, displacement member 114 comprises a compression spring, which is compressed to forcefully bias bearing means 110 radially outward against interior pipe surface 82. To transmit the load of spring 114, a piston 116 generally extends between spring 114 and bearing housing 112. Each spring 114 is retained within a cavity 118 surrounded by a sleeve 120 or outer wall 120. Alternatively, in lieu of a compression spring, any other spring or means for forcefully biasing bearing means against the pipe known to one of ordinary skill may be employed. To maintain a constant, desired distance D between heat source 32 and pipe surface 82, first extension 104 remains rigid during the translation of pipe 80 along cantilevered structure 30. However, each of the extensions 104, 106, 108 may have adjustable lengths to accommodate different sized pipe, where such adjustments are made prior to substantial translation of pipe 80 along structure 30. In other embodiments, in lieu of extensions 104, 106, 108, other alignment means capable of maintaining the interior surface 82 of the pipe a distance D from heat source 32 may be employed. For example, air bearings, magnetic levitation (which is also referred to as "maglev"), or magnetic suspension principles may be employed to control the alignment of pipe 80 relative to heat source 32.

While this invention has been described with reference to particular embodiments thereof, it shall be understood that such description is by way of illustration and not by way of limitation. Accordingly, the scope and content of the invention are to be defined only by the terms of the appended claims. The use of words and phrases herein with reference to specific embodiments, as will be understood by those skilled in the art, does not limit the meanings of such words and phrases to those specific embodiments. Words and phrases herein have their ordinary meanings in the art, unless a specific definition is set forth at length herein.

What is claimed is:

1. A method for metallurgically bonding cladding material onto a metal substrate, the method comprising the steps of:
    providing a metal substrate comprising a pipe or a tube having a cladding composition arranged along an interior surface of the substrate to form a coated substrate, the interior surface arranged within an interior cavity of the substrate;
    inserting a heat source into an interior cavity of the substrate, the heat source being mounted on a heat source-retaining housing;
    applying heat discharged from the heat source to the coated substrate along the coated interior surface until the cladding composition metallurgically bonds to the interior surface of the substrate; and
    translating the coated substrate in an axial direction of the substrate after bonding a portion of the cladding composition to the interior surface of the substrate and further heating the coated substrate to bond another portion of the cladding composition to the interior surface of the substrate at another longitudinal location along a length of the substrate,
    wherein the step of inserting a heat source into the substrate comprises translating the substrate with a translation device,
    wherein the translation device rotates the coated substrate during the step of applying heat, and
    wherein the translation device is a trolley arranged to translate along a track.

2. The method of claim 1, where the heat source-retaining housing is a cantilevered structure extending from a base such that the heat source is effectively cantilevered from the base.

3. The method of claim 1 further comprising the step of:
    controlling the atmosphere surrounding the heat source and a heat-affected area along the interior of the substrate.

4. The method of claim 3, where the step of controlling includes forming at least a partial barrier across a transverse width of the substrate interior cavity on each side of the heat source, where a flow of gas is injected into the substrate internal cavity between the partial barriers.

5. The method of claim 1, wherein the heat source is configured to provide a heat flux of 350 to 5700 W/cm$^2$.

6. The method of claim 5, where the heat source is a heat lamp.

7. The method of claim 6, where the heat lamp is a plasma arc lamp.

8. The method of claim 1 further comprising the step of:
    directing a flow of gas across a heat discharging portion of the heat source to provide a protective barrier of flowing gas between the heat source and the substrate.

* * * * *